(12) United States Patent
Bertolini et al.

(10) Patent No.: US 12,398,758 B2
(45) Date of Patent: Aug. 26, 2025

(54) BEARING UNIT

(71) Applicant: Aktiebolaget SKF, Gothenburg (SE)

(72) Inventors: Andrea A. Bertolini, Carrara (IT); Fausto Baracca, Massa (IT); Pasquale Frezza, Aversa (IT)

(73) Assignee: Aktiebolaget SKF, Gothenburg (SE)

( * ) Notice: Subject to any disclaimer, the term of this patent is extended or adjusted under 35 U.S.C. 154(b) by 65 days.

(21) Appl. No.: 18/434,267

(22) Filed: Feb. 6, 2024

(65) Prior Publication Data
US 2024/0280141 A1    Aug. 22, 2024

(30) Foreign Application Priority Data

Feb. 16, 2023  (IT) .................. 102023000002691

(51) Int. Cl.
| F16C 19/06 | (2006.01) |
| F16C 23/08 | (2006.01) |
| F16C 33/66 | (2006.01) |
| F16C 33/78 | (2006.01) |
| F16C 33/80 | (2006.01) |
| F16C 35/063 | (2006.01) |

(52) U.S. Cl.
CPC .......... F16C 33/7823 (2013.01); F16C 19/06 (2013.01); F16C 23/084 (2013.01); F16C 33/6618 (2013.01); F16C 33/7853 (2013.01); F16C 33/80 (2013.01); F16C 35/063 (2013.01); *F16C 2310/00* (2013.01)

(58) Field of Classification Search
CPC .... F16C 19/06; F16C 23/084; F16C 33/6618; F16C 33/7823; F16C 33/80; F16C 33/7856; F16C 35/063; F16C 2310/00
See application file for complete search history.

(56) References Cited

U.S. PATENT DOCUMENTS

| 2,102,375 A | 12/1937 | Morton |
| 3,036,872 A * | 5/1962 | King, Jr. ............... F16C 33/583 |
| | | 384/537 |
| 3,772,397 A | 11/1973 | Rausch |

(Continued)

FOREIGN PATENT DOCUMENTS

| DE | 1959724 A1 * | 6/1971 |
| DE | 2601798 A1 | 7/1976 |
| GB | 2076906 A | 12/1981 |

OTHER PUBLICATIONS

Examination Report of the National Intellectual Property Office of Italy in Application No. 102023000002691, dated Sep. 5, 2023; 8pgs.

*Primary Examiner* — Phillip A Johnson
(74) *Attorney, Agent, or Firm* — Stinson LLP

(57) ABSTRACT

A bearing unit (10) has a radially outer ring (31), a radially inner ring (33), an eccentric locking collar (40), a row of rolling bodies (32), and a sealing device (50). The sealing device (50) is arranged on the same side as the locking collar (40) and is interposed between the radially inner ring (33), the radially outer ring (31) and the locking collar (40). The sealing device (50) includes a metal shield (55) stably connected to the radially outer ring (31), and an elastomeric component (60) co-molded on the shield (55) in a radially inward direction. The elastomeric component (60) has a plurality of lips, of which at least one lip (64, 65) is in contact with the locking collar (40).

11 Claims, 2 Drawing Sheets

(56) References Cited

U.S. PATENT DOCUMENTS

| | | | | |
|---|---|---|---|---|
| 4,164,063 A | * | 8/1979 | Cenko | F16C 35/063 |
| | | | | 29/898.044 |
| 5,897,214 A | * | 4/1999 | Nisley | F16C 35/073 |
| | | | | 384/537 |
| 6,939,053 B2 | * | 9/2005 | Nisley | F16D 1/096 |
| | | | | 29/898.07 |

* cited by examiner

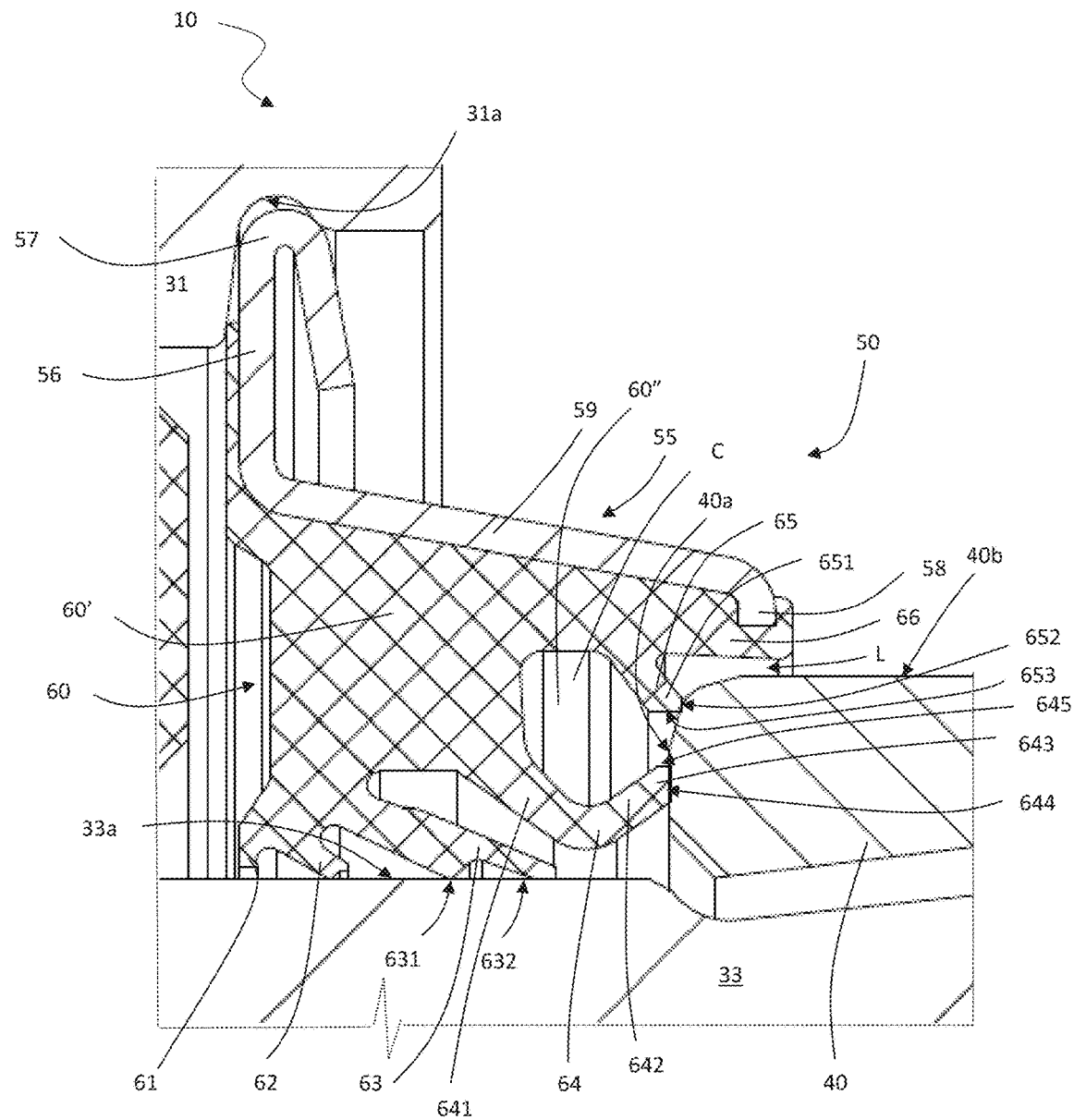
Fig. 2 – Det. A

BEARING UNIT

CROSS-REFERENCE TO RELATED APPLICATION

This application claims priority to Italian Application No. 102023000002691, filed Feb. 16, 2023, the entirety of which is hereby incorporated by reference.

FIELD

The present disclosure relates to a bearing unit. The bearing unit is suitable for use in the manufacturing sector, in particular in the agricultural and mining sectors, and for other demanding applications characterized by dusty environments.

BACKGROUND

The bearing unit generally has a first component, for example a radially outer ring, which is fastened to a stationary element, usually a containment casing, and a second component, for example a radially inner ring, which is fastened to a rotary element, normally a rotary shaft. In other applications, the radially inner ring may be stationary and the radially outer ring may be rotary. In any case, the rotation of one ring in relation to the other in the roller bearing units is enabled by a plurality of rolling bodies that are positioned between the two surfaces of the components normally referred to as raceways. The rolling bodies may be balls, cylindrical or conical rollers, needle rollers, and similar rolling bodies.

It is known for bearing units to have sealing devices to protect the raceways and rolling bodies against external contaminants and to seal the lubricating grease. Typically, the sealing devices are made up of a co-moulded elastomer gasket on a shaped metal shield mounted by interference or chamfering in a seat in the rings of the bearing unit, for example the radially outer ring. The gasket is provided with at least one contacting or non-contacting sealing lip that forms a seal by means of sliding contact with the other ring of the bearing unit, or by means of a labyrinth formed with the same ring.

Unlike other applications, the bearing units used in agricultural applications often only have this type of sealing device and do not have any other protection against external contaminants (such as a second axially outer metal shield). This is related to the common risk in agricultural applications of plant fibres coming between the second shield and the gasket, removing the shield from the bearing unit, and exposing the gaskets directly to contaminants.

Consequently, the sealing devices described above are used on their own in agricultural applications, and performance is improved by changing the number of contacting lips. However, this solution inevitably increases axial size, which is somewhat incompatible with the systems for fastening the radially inner ring to the rotary shaft. This problem is particularly relevant in applications that use an eccentric locking collar as a fastening system.

SUMMARY

The present disclosure is therefore intended to provide a bearing unit that does not have the drawbacks described above. This is achieved by a novel sealing device that uses the locking system as part of the sealing system, so as to create a direct contact between the locking collar and the sealing lips of the sealing device.

The present disclosure provides a bearing unit having the features set out in the attached claims.

BRIEF DESCRIPTION OF THE DRAWINGS

The present disclosure is described below with reference to the attached drawings, which show some non-limiting example embodiments of the bearing unit, in which:

FIG. 2 is a magnified cross-sectional view of a detail of the bearing unit in FIG. 1.

DETAILED DESCRIPTION

Figure 1:
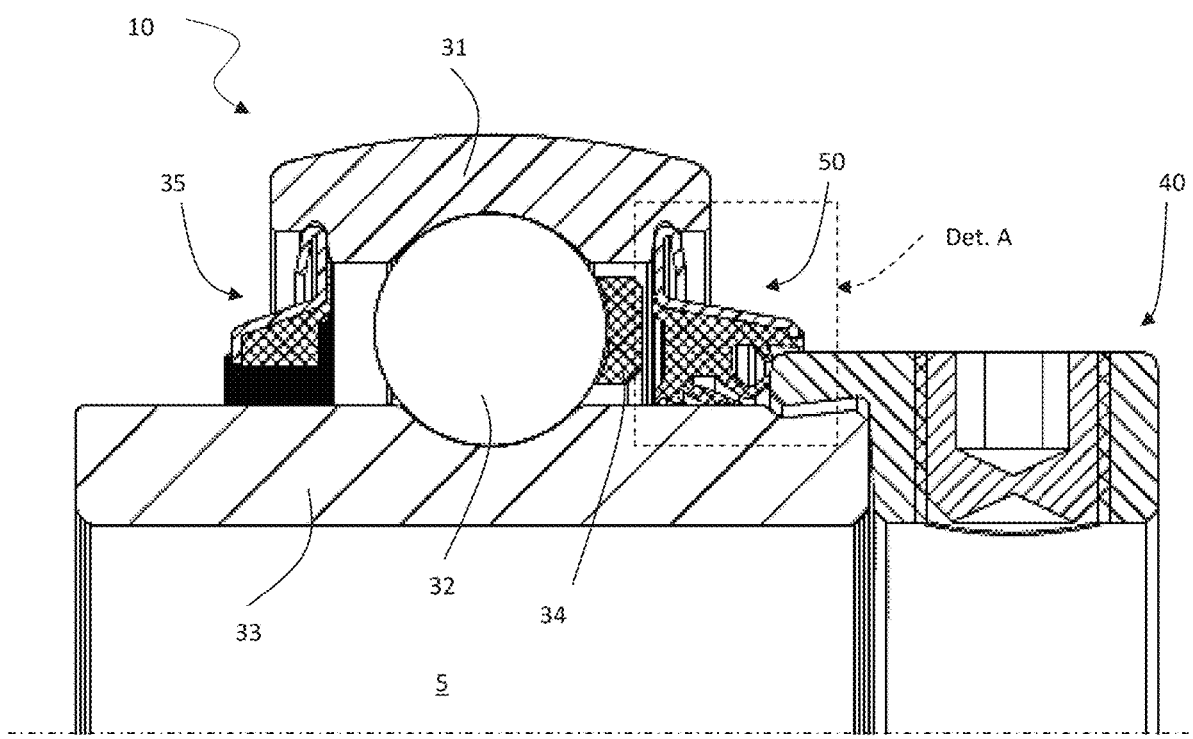
FIG. 1 is a cross-sectional view of a preferred embodiment of the bearing unit of the present disclosure.

In FIG. 1, reference sign 10 denotes a bearing unit as a whole that is intended mainly, but not exclusively, for use in the agricultural sector. The bearing unit 10 may comprise a stationary radially outer ring 31. The bearing unit 10 may comprise a radially inner ring 33 that is rotary about a central axis X of rotation of the bearing unit 10, and constrained to rotate with a rotary shaft 5 by an eccentric locking collar 40. The bearing unit 10 may comprise a row of rolling bodies 32, in this case balls, interposed between the radially outer ring 31 and the radially inner ring 33 to enable relative rotation. The bearing unit 10 may comprise a cage 34 for the rolling bodies to hold the rolling bodies of the row of rolling bodies 32 in position.

Throughout the present description and in the claims, terms and expressions indicating position and orientation, such as "radial" and "axial", should be understood with reference to the axis X of rotation of the bearing unit 10.

The bearing unit 10 is also provided with two sealing devices arranged axially on opposite sides of the bearing unit 10, to seal said unit from the external environment. In particular, a first sealing device is arranged on the side opposite the locking collar 40, and is of a known type. For this reason, the sealing device 35 is shown only schematically in the figure and is not further described.

A second sealing device 50 is arranged on the same side as the locking collar 40 and is the subject of the present disclosure. Indeed, according to the present disclosure, the sealing device is provided with a suitable number of lips to create a contact with the eccentric locking collar 40.

Advantageously, the sealing device is shaped to create a labyrinth with the locking collar 40.

The compatibility of the sealing device with the locking collar advantageously helps the entire sealing system to enhance protection of the bearing unit. In other words, the present disclosure creates a synergy between the closing system and the sealing system.

With reference to FIG. 2, the second sealing device 50 (hereinafter referred to more simply as the sealing device 50) is interposed between the radially inner ring 33, the radially outer ring 31 and the locking collar 40. In particular, the sealing device 50 is stably fastened in a radially inner slot 31a of the radially outer ring 31 and, by means of the contacting lips thereof, creates a seal with the radially inner ring 33 and the locking collar 40, as described in greater detail below.

The sealing device 50 may comprise a metal shield 55 stably connected to the radially outer ring 31. The sealing device 50 may comprise an elastomeric component 60 co-molded on the shield 55 in a radially inward direction, having an approximately frustoconical base structure 60', and provided with a plurality of lips, of which at least one lip 64, 65 is in contact with the locking collar 40.

Preferably, as shown in the embodiment in FIG. 2, both of the lips 64, 65 are in contact with the locking collar 40.

The metal shield 55 may be provided with a radially outer flange portion 56 having a V-shaped cross section. The flange portion 56 has a radially outer rounded vertex 57 stably inserted into the seat 31a of the radially outer ring 31. The metal shield 55 may be provided with a radially inner, axially outer appendage 58. The metal shield 55 may be provided with a frustoconical central portion 59 that connects the flange portion 56 to the appendage 58.

As already mentioned, the elastomeric component 60 is in turn provided with a plurality of lips, and in particular may be provided with a radially and axially inner radial protuberance 61 intended to contain the grease placed inside the bearing unit. The radial protuberance 61 is not in contact with a radially outer surface 33a of the radially inner ring 33. The elastomeric component 60 may be provided with a first lip 62 that is radially inside and axially outside the radial protuberance 61, the first lip 62 being in contact with the surface 33a of the radially inner ring 33. The elastomeric component 60 may be provided with a second lip 63 that is radially inside and axially outside the first lip 62, the second lip 63 also being in contact with the surface 33a of the radially inner ring 33 by means of a first contact area 631 and a second contact area 632. The elastomeric component 60 may be provided with a third lip 64 in the shape of a "V" opening radially outward in cross section. The axially outer third lip 64 is radially outside the aforementioned lips. It is in contact with an axially inner first surface 40a of the locking collar 40. It is formed by two mutually adjacent portions: a root 641 that is connected to the base 60' of the elastomeric component 60, and a distal portion 642 that, under the effect of the axial compression caused by the axial contact with the locking collar 40, is folded over the root 641 to define the aforementioned "V" shape. The distal portion 642 of the third lip 64 has a contacting tip 643 delimited by two surfaces: a first surface 644 approximately transverse to the axis X and a second surface 645 approximately parallel to the axis X. The first surface 644 is in contact with the surface 40a of the locking collar 40. The elasticity provided by the "V" shape makes the contact as uniform as possible, thereby improving sealing performance. The elastomeric component 60 may be provided with an axially outer fourth lip 65 radially outside the third lip 64, the fourth lip 65 also being in contact with the axially inner surface 40a of the locking collar 40. The fourth lip 65 extends radially from the base 60' of the elastomeric component 60 towards the locking collar 40 and has a contacting tip 651 delimited by two surfaces: a first surface 652 approximately transverse to the axis X and a second surface 653 approximately parallel to the axis X. The first surface 652 is in contact with the surface 40a of the locking collar 40. The tip 651 of the fourth lip 65 and the tip 643 of the third lip 64 are arranged at a predetermined radial distance from one another.

An annular loop 60" is defined between the base 60' of the elastomeric component 60, the third lip 64 and the fourth lip 65. In use, the annular loop 60" is completely isolated from the outside when the tip 643 of the third lip 64 and the tip 651 of the fourth lip 65 come into contact with the surface 40a of the locking collar 40. This creates a chamber C between the third lip 64, the fourth lip 65 and the first surface 40a of the locking collar 40. The external contaminants are stopped in this chamber C and create an obstacle for contaminants that could subsequently enter the sealing device 50.

Advantageously, the chamber C may also be filled with fresh grease before assembling the bearing unit 10. This creates a contact zone between the sealing device 50 (in particular the third lip 64) and the locking collar 40, said contact zone also being used to lubricate the locking collar itself. Simultaneously, the presence of grease, which is known to have high viscosity, creates a very viscous, swamp-like barrier against the ingress of external contaminants.

Advantageously, the elastomeric component 60 may be provided with an axially outer axial protuberance 66 radially outside the fourth lip 65. The axial protuberance 66 forms a labyrinth L with a radially outer second surface 40b of the locking collar 40.

The seals created by the third lip 64 and by the fourth lip 65, both of which are in contact with the locking collar 40, and the seal created by the labyrinth L between the axial protuberance 66 and the locking collar 40 all improve the sealing system as a whole, which, as already mentioned, also benefits from cooperation of the locking collar 40.

The labyrinth L, or the gap between the axial protuberance 66 and the locking collar 40, can indeed be considered to be a further seal, protecting all of the axially more internal lips of the sealing device 50 against external contaminants, and consequently improving the protection of the bearing unit 10.

The radial dimension of the labyrinth L is preferably between 0.2 mm and 0.4 mm. Any contact between the axial protuberance 66 and the locking collar 40 would not create a problem other than a slight increase in friction torque, but would also simultaneously improve the protection of the bearing unit 10 against external contaminants. This solution works better in all applications in which the friction torque is not very high (agricultural sector, heavy industry, mining, etc.).

To create the labyrinth L, the shield 55, and in particular the central portion 59 thereof, need simply be designed so that the elastomeric component 60 (in particular the axial protuberance 66 thereof) axially overlaps the locking collar 40 (in particular the second surface 40b thereof). In short, it is primarily the axial length of the central portion 59 of the shield 55 that should be adjusted.

Another important effect of this dimensioning is that the shield 55 and the elastomeric component 60 with its axial protuberance 66 completely overlap, in all cases in the axial direction, all of the lips of the elastomeric component 60, creating an "umbrella" effect that protects the lips from the external environment.

The axial dimension of the radially inner ring 33 guaranteeing contact between the lips of the elastomeric component 60 and the locking collar 40 is smaller than in known solutions. This reduces the axial dimensions of the bearing unit 10, which benefits end users.

Reducing the axial dimension of the radially inner ring 33, during assembly, the locking collar 40 comes into contact with and bends the third lip 64 and the fourth lip 65 upon contact between a metal component (the collar) and an elastomeric component.

In particular, the third lip 64 is the lip that alone provides the sealing device 50 with a high performance seal, and is highly flexible as a result of its "V" shape. This makes it possible to provide relative axial positioning between the sealing device 50 and the locking collar 40 so that the interference between the third lip 64 and the first surface 40a is between 0.5 mm and 0.7 mm, these values being greater than the interference values for contacting lips in known sealing devices (interference values not greater than 0.4 mm).

Again with the objective of enhancing the performance of the sealing device 50, the fourth lip 65 is a slightly contacting lip arranged axially inside the labyrinth L, i.e. immediately downstream of the labyrinth L along the path of a potential contaminant entering from the external environment towards the bearing unit. The interference of the fourth lip 65 with the first surface 40a of the locking collar 40 should not be less than 0.1 mm, even under the worst possible tolerance conditions. The lesser interference for this fourth lip 65 compared to the interference provided for the third lip 64 can be explained by the need to avoid an excessively adverse effect on friction torque. In any case, even with such interference values, the fourth lip 65 is nonetheless useful in protecting the bearing unit 10 and the grease contained therein against lightweight external contaminants such as dust and small particles.

In short, the sealing device according to the present disclosure improves the protection of the bearing unit against external contaminants, and consequently the service life of said bearing unit.

Numerous other variants exist in addition to the embodiments of the present disclosure described above. These embodiments should also be understood to be examples and do not limit the scope, applications or possible configurations of the present disclosure. Indeed, although the description provided above enables the person skilled in the art to carry out the present disclosure at least according to one example configuration thereof, numerous variations of the components described could be used without thereby departing from the scope of the present disclosure, as defined in the attached claims interpreted literally and/or according to their legal equivalents.

What is claimed is:

1. A bearing unit comprising:
   a stationary radially outer ring,
   a radially inner ring rotatable with respect to an axis of rotation,
   an eccentric locking collar configured to constrain the radially inner ring to rotation with a rotating shaft,
   a row of rolling bodies interposed between the radially outer ring and the radially inner ring, and
   a sealing device arranged on the same side as the locking collar, the sealing device being interposed between the radially outer ring, the radially inner ring and the locking collar, the sealing device comprising:
      a shield made of metallic material, the shield stably connected to the radially outer ring, and
      an elastomeric component co-molded on the shield in a radially internal direction, the elastomeric component having a plurality of lips, wherein at least one lip of the plurality of lips is in contact with the locking collar.

2. The bearing unit according to claim 1, wherein the elastomeric component comprises:
   a radial protuberance, radially and axially internal, which has the function of containing the grease located inside the bearing unit,
   a first lip, radially internal and axially external with respect to the radial protuberance and contacting a surface of the radially inner ring,
   a second lip, radially internal and axially external with respect to the first lip and also contacting the surface of the radially inner ring,
   a third lip, V-shaped, radially external with respect to the first and second lips and axially external, the third lip being in contact with a first surface, axially internal, of the locking collar, and
   a fourth lip, radially external with respect to the third lip and axially external, the fourth lip also being in contact with the surface of the locking collar.

3. The bearing unit according to claim 2, wherein the elastomeric component is provided with an axial protuberance, radially external with respect to the fourth lip and axially external, the axial protuberance cooperating with a second surface, radially external, of the locking collar to define a labyrinth.

4. The bearing unit according to claim 3, wherein a radial dimension of the labyrinth is between 0.2 mm and 0.4 mm.

5. The bearing unit according to claim 2, wherein the interference, in use, between the third lip and the first surface of the locking collar is between 0.5 mm and 0.7 mm.

6. The bearing unit according to claim 2, wherein the interference, in use, between the fourth lip and the first surface of the locking collar is not less than 0.1 mm.

7. The bearing unit according to claim 2, wherein the third lip, fourth lip and first surface of the locking collar define an accumulation chamber for external contaminants.

8. The bearing unit according to claim 7, wherein the chamber contains lubricating grease.

9. The bearing unit according to claim 8, wherein the shield comprises:
   a flange portion, radially external, V-shaped,
   an appendage, radially internal and axially external, and
   a central portion, with a truncated cone shape, which connects the flange portion to the appendage.

10. The bearing unit according to claim 1, wherein the shield comprises:
    a flange portion, radially external, V-shaped,
    an appendage, radially internal and axially external, and
    a central portion, with a truncated cone shape, which connects the flange portion to the appendage.

11. The bearing unit according to claim 10, wherein the flange portion has a rounded vertex, radially external, permanently inserted into a seat of the radially outer ring.

* * * * *